F. W. BEARG.
PULLEY LAGGER.
APPLICATION FILED APR. 15, 1918.
1,283,458.
Patented Nov. 5, 1918.
2 SHEETS—SHEET 1.
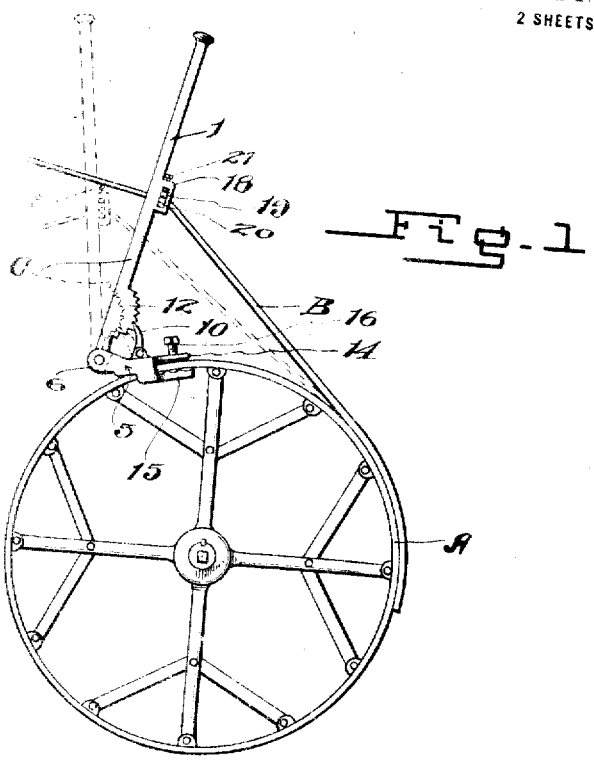
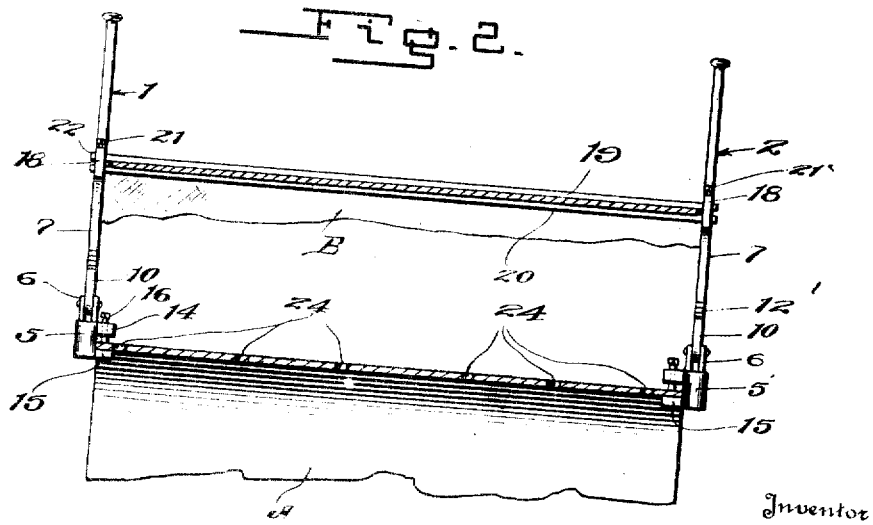
Inventor
F. W. Bearg.
By Lancaster & Allwine
his Attorneys.

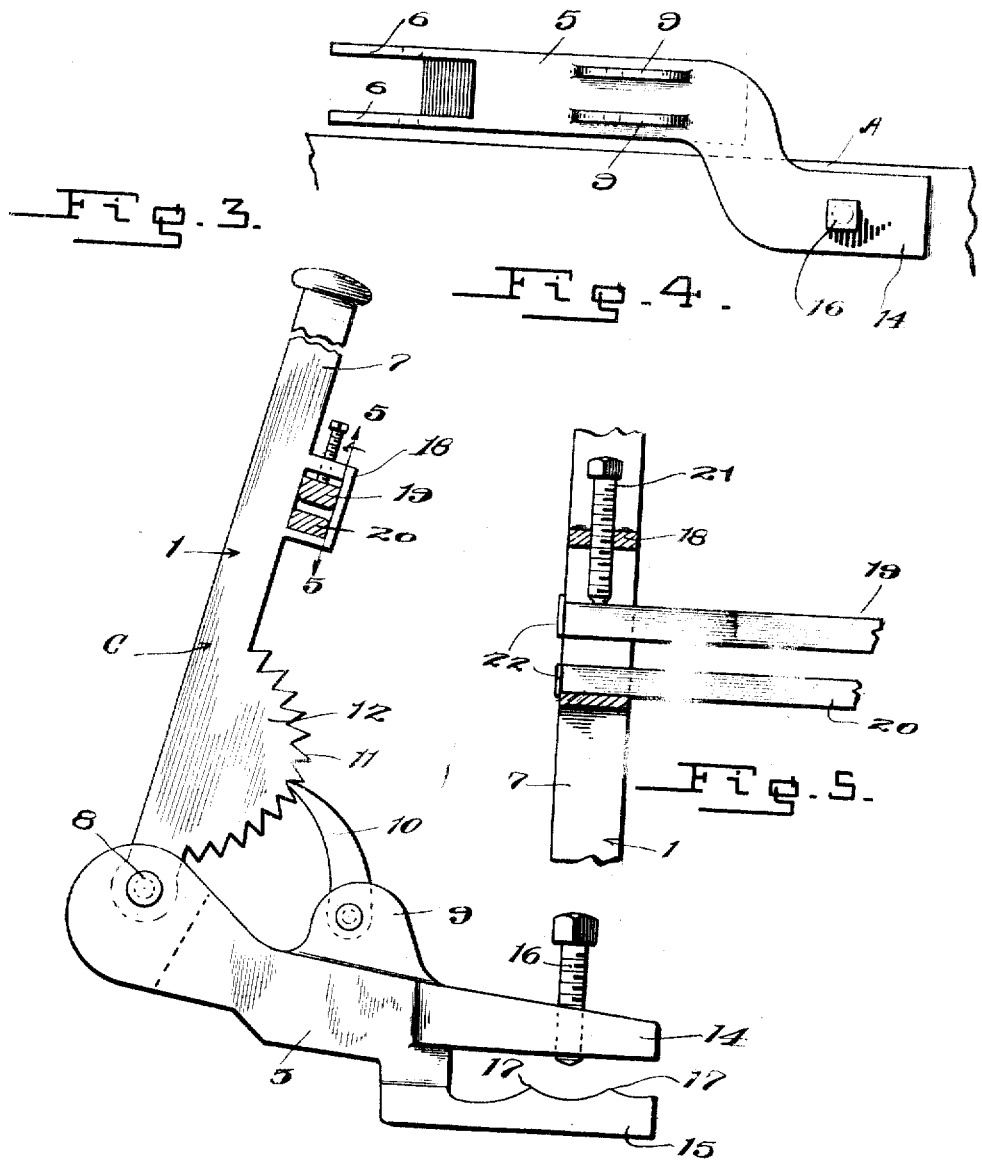

ated Nov. 5, 1918.

UNITED STATES PATENT OFFICE.

FRANK W. BEARG, OF FAIRFIELD, NEBRASKA.

PULLEY-LAGGER.

1,283,458.

Specification of Letters Patent.   Patented Nov. 5, 1918.

Application filed April 15, 1918. Serial No. 228,708.

*To all whom it may concern:*

Be it known that I, FRANK W. BEARG, a citizen of the United States, and a resident of Fairfield, in the county of Clay and State of Nebraska, have invented certain new and useful Improvements in Pulley-Laggers, of which the following is a specification.

This invention relates to pulley laggers, and the primary object of the invention is to provide a device whereby a pulley face may be lagged or covered with belting by one person.

An object of this invention is to provide a device for facilitating the lagging or covering of pulley faces which includes a pair of levers having belt gripping members carried thereby and pulley face gripping members pivotally connected to their lower ends and to associate means with the levers and the pulley face gripping members for holding the levers in adjusted position to hold a section of belting taut about the face of a pulley until the belting is riveted or otherwise suitably attached to the pulley face.

A still further object of this invention is to provide a belt lagger including pulley face gripping members each of which comprises a pair of jaws offset laterally from the main body thereof, one being adapted to engage the outer surface of a pulley rim and the other the inner surface of the rim, to provide adjustable means carried by the outer or face engaging arm for securely clamping the members upon a pulley rim and also to provide laterally extending ribs upon the pulley engaging surface of the arms which engage the inner surface of the pulley rim to cause them to bite into the rim and to adapt the members for attachment to pulleys of various diameters.

Other objects of the invention will appear in the following detailed description, taken in connection with the accompanying drawings, forming a part of this specification, and in which drawings:

Figure 1 is a side elevation of a pulley showing the lagger applied thereto.

Fig. 2 is a fragmentary section through the rim of a pulley showing the lagger applied thereto.

Fig. 3 is a detail side elevation of one of the levers and pulley gripping members of the lagger.

Fig. 4 is a top plan of one of the pulley gripping members.

Fig. 5 is a fragmentary section on the line 5—5 of Fig. 3.

Referring more particularly to the drawings, A designates an ordinary pulley and B the belting to be attached to the face of the pulley. The improved lagger is generically indicated by the letter C and it comprises sections 1 and 2, one of which is placed upon each side of the pulley.

The sections 1 and 2 each comprise a main body 5 which has a pair of spaced ears 6 formed upon one end of the same to which ears a lever 7 is pivotally connected as shown at 8. The body 5 has upstanding lugs 9 formed thereon between and to which lugs a pawl 10 is pivotally connected. The pawl 10 co-acts with the ratchet teeth 11 formed upon the edge of the enlargement 12 of the lever 7 for holding the lever in adjusted pivotal position. The body 5 is provided with a pair of laterally offset arms 14 and 15, the arm 15 being positioned below the arm 14 and adapted for engagement with the inner surface of a pulley rim as shown in Fig. 1 of the drawings. The arm 14 is adapted to be positioned outwardly of the face of the pulley and a set screw 16 is adjustably carried by the arm 14, for binding engagement against the face of the pulley to force the lateral toothed ribs 17 which are formed upon the upper face of the arm 15 into biting engagement with the inner surface of the pulley rim. By providing the lateral teeth or ribs 17, the body 5 will be adapted for attachment to pulleys of various diameters.

The lever 7 has a clamp confining bracket 18 formed thereon and belt clamping bars 19 and 20 extend from one of the sections to the other. Set screws 21 are carried by the bracket 18 for forcing the bar 19 against the belting B which belting is positioned between the bars 19 and 20 and also for forcing the bar 20 against the lower end of the confining brackets 18. Heads 22 are formed upon the ends of the bars 19 and 20 to prevent them from moving endwise.

In covering or lagging a pulley face, the pulley is first drilled to provide a plurality of openings, as indicated at 24 in Fig. 2, in sets transversely of the face which sets are circumferentially spaced. The end of the belting B is then riveted or otherwise suitably attached to the pulley face at one of these sets of openings and the belting is passed between the bars 19 and 20 and clamped therebetween by the adjustment of the set screws 21. The body members 5 have previously been attached to the pulley rim, and after the belt has been properly connected between the bars 19 and 20, the levers 7 are rocked upon their pivots to stretch the belt and hold it taut in facial abutment with portions of the face of the pulley and when each set of circumferentially spaced openings is reached, the belt is riveted to the face of the pulley and the lagger is moved about the pulley rim for stretching the next portion of the belt to properly cover the pulley face.

Having thus fully described the invention, what is claimed is:

1. In a pulley lagger, the combination, of a body block, a pair of laterally offset arms carried by said body block and adapted for positioning one upon the outer surface of a pulley rim and the other against the inner surface of the pulley rim, said last named arm having laterally extending teeth upon its pulley rim engaging surface, and means carried by the arm for positioning outwardly of a pulley face for engagement with a pulley face to securely clamp the body block thereon.

2. In a pulley lagger, the combination, of a pair of pivotally supported levers, confining brackets carried by said levers, a pair of belt clamping bars carried by said brackets, and means for clamping said bars in engagement with a belt.

3. In a pulley lagger, the combination, of a body block, a pair of vertically spaced laterally offset arms formed upon said body block, one of said arms provided with lateral teeth upon its upper surface, means adjustably carried by the other arm for clamping engagement with a pulley face, and belt tightening means carried by said body block.

4. In a pulley lagger, the combination, of a pair of body blocks, vertically spaced laterally offset arms formed upon said body blocks, means carried by said arms for gripping engagement with a pulley rim, a pair of levers pivotally carried by said body blocks, belt clamping means carried by said levers, and means carried by said body blocks for co-action with companion means carried by said levers for holding the levers in adjusted position.

5. In a pulley lagger, the combination, of a pair of pivotally mounted levers, supports for said levers, means carried by said supports for gripping engagement with a pulley rim to pivotally support the levers upon the pulley rim, clamping means carried by said levers for clamping engagement with a belt whereby a belt will be stretched upon pivotal movement of said levers, enlargements formed upon said levers, ratchet teeth formed upon the edges of said enlargements, and pawls carried by said lever supports for engagement with said ratchet teeth to hold said levers in adjusted position.

6. In a pulley lagger, the combination, of body blocks, pulley face gripping means carried by said body blocks, levers pivotally connected to said body blocks, confining brackets carried by said levers, and a pair of belt clamping bars carried by said brackets.

7. In a pulley lagger, a body, means carried by said body for attaching it to a pulley rim, a lever pivotally carried by said body, a ratchet formed upon said lever, belt clamping means carried by said lever, and a pawl carried by said body and co-acting with said ratchet for holding said lever in adjusted positions.

8. In a pulley lagger, the combination, of a pair of body blocks, means carried by said body blocks for gripping engagement with a pulley rim, a pair of levers pivotally carried by said body blocks, belt clamping means carried by said levers, and means carried by said body blocks for co-action with companion means carried by said levers for holding the levers in adjusted positions.

9. In a pulley lagger, the combination, of means for attachment with the rim of a pulley, belt tightening means adjustably carried by said attaching means, means for holding said belt tightening means in adjusted position, confining brackets carried by said belt tightening means, a pair of belt gripping bars carried by said confining brackets, and means for clamping said bars in engagement with a belt.

10. In a pulley lagger, the combination, of a pair of pivotally mounted levers, supports for said levers, means carried by said supports for gripping engagement with a pulley rim to pivotally support the levers upon the rim, confining brackets carried by said levers, a pair of belt clamping bars carried by said brackets, and means for clamping said bars in engagement with a belt.

11. In a pulley lagger, the combination, of a pair of pivotally mounted levers, supports for said levers, means carried by said supports for gripping engagement with a pulley rim to pivotally support the levers upon the rim, confining brackets carried by said levers, a pair of belt clamping bars carried by said brackets, means for clamping said bars in engagement with a belt, ratchets formed upon said levers, and pawls carried by said lever supports and adapted for engagement with the lever carried ratchets for holding the levers in adjusted positions.

12. In a pulley lagger, the combination, of a body block, a pair of vertically spaced laterally offset arms formed upon said block, one of said arms provided with lateral teeth upon its upper surface, means adjustably carried by the other arm for clamping engagement with a pulley face, adjustable belt tightening means carried by said body block, a pair of belt clamping bars carried by said belt tightening means, and means for clamping said bars in engagement with a belt to connect the belt to the tightening means.

13. In a pulley lagger, the combination, of body blocks, pulley face gripping means carried by each of said body blocks, levers pivotally connected to said body blocks, and belt clamping members carried by said levers for longitudinal and lateral movement with respect to the levers.

14. In a pulley lagger, the combination, of means for attachment with the rim of a pulley, belt tightening means adjustably carried by said attaching means, means for holding said belt tightening means in adjusted positions, and means carried by said belt tightening means for longitudinal and lateral movement with respect thereto and for clamping engagement with a belt.

FRANK W. BEARG.